Figure 1:
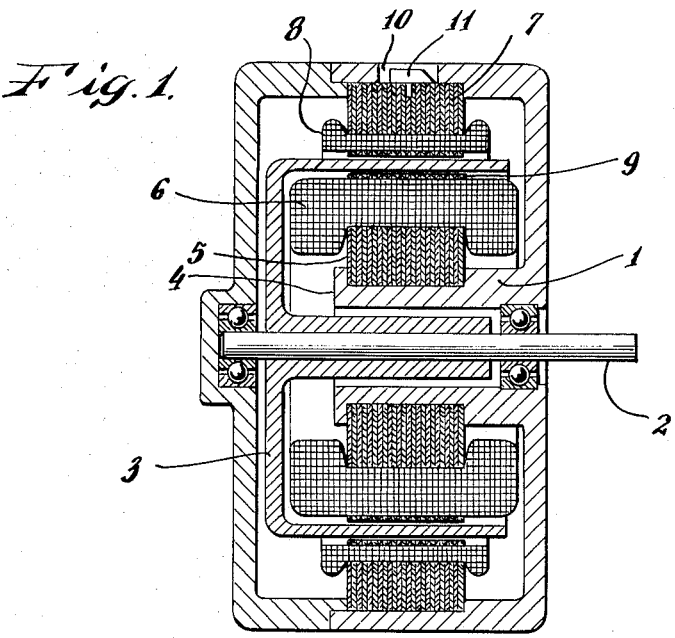

April 26, 1966  M. KNAUER  3,248,584
ROTARY VARIABLE ELECTROMAGNETIC COUPLING DEVICE
Filed April 26, 1963

INVENTOR.
Max Knauer
BY
Andrew L. Ey
ATTORNEY.

United States Patent Office 3,248,584
Patented Apr. 26, 1966

3,248,584
ROTARY VARIABLE ELECTROMAGNETIC
COUPLING DEVICE
Max Knauer, Uberlingen (Bodensee), Germany, assignor to Bodenseewerk Perkin-Elmer & Co., G.m.b.H., Uberlingen (Bodensee), Germany
Filed Apr. 26, 1963, Ser. No. 276,050
Claims priority, application Germany, May 3, 1962, B 67,084
4 Claims. (Cl. 310—171)

The present invention relates to rotary variable electromagnetic coupling devices or dynamos and particularly to a technique whereby their operation may be accurately controlled. The term dynamo as used in this specification and the appended claims is intended to apply to that type of a machine capable of transforming electrical energy to mechanical energy or vice versa by utilizing magnetic induction to achieve such transformations. The foregoing is the definition of a dynamo given in "International Dictionary of Physics and Electronics," published by D. Van Nostrand Company, Incorporated. The invention relates more particularly to dynamos or rotary variable electromagnetic coupling devices of the type which is capable of operating as a tachometer generator or as an induction motor.

In one type of dynamo construction an exciting winding and a control winding are wound on the stator of the dynamo in spatially crossed relationship. A cylinder shaped rotor of conductive non-ferromagnetic material rotates in the air gap of the stator. When the dynamo is operated as a motor, the electrical signals supplied to the exciting winding and the control winding are 90° out of phase. Theoretically, when the voltage applied to the control winding is zero the motor is at rest. When a voltage other than zero is applied to the control winding, the rotor obtains a torque proportional to this voltage. When the dynamo is operated as a generator, a voltage proportional to the speed of the rotor is induced in the control winding. Whether operated as a motor or generator, difficulties are encountered with this type of dynamo in that under zero conditions residual voltages are induced in the control winding so that an undesired residual torque remains or a non-existing rotational speed of the rotor is simulated.

One presently known technique for overcoming this problem is to provide a two part stator, one part being movable relative to the other for adjusting purposes. With this type of construction, one stator member carries the exciting winding and the other stator member carries the control winding. This arrangement however is not suitable for a sensitive adjustment of the zero condition and for the elimination of the existing residual voltages.

It is therefore an object of the present invention to provide a new and improved rotary variable electromagnetic coupling device or dynamo.

It is another object of the present invention to provide a dynamo wherein the residual effects are eliminated.

It is a further object of the present invention to provide a new and improved dynamo not subject to the shortcomings and limitations of presently used dynamos.

A dynamo constructed in accordance with the present invention comprises first and second stator members and first and second windings wound on the first stator member in spatially crossed or quadrature relationship. Such a dynamo also includes a rotor member positioned between the stator members and free to rotate therebetween and means for introducing magnetic irregularities in the second stator member.

For a better understanding of the present invention, together with other and further objects thereof, reference is had to the following description, taken in connection with the accompanying drawings, and its scope will be pointed out in the appended claims.

Figure 2:
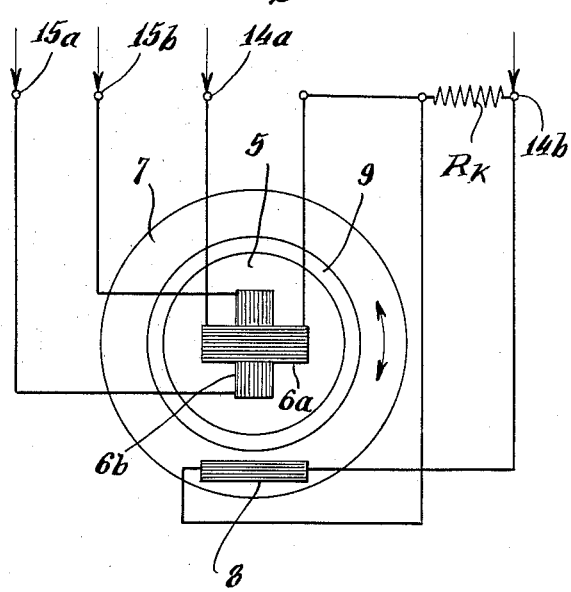
Figure 3:
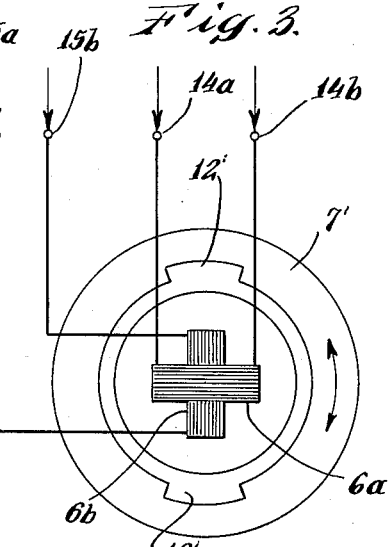

Referring to the drawing:
FIGURES 1 and 2 show one embodiment of a dynamo constructed in accordance with the present invention; and
FIGURE 3 shows a second embodiment of a dynamo constructed in accordance with the present invention.

*Description and operation of the invention*

Referring to FIGURE 1, a dynamo constructed in accordance with the present invention includes a cup-shaped drum rotor 3, preferably of light metal, mounted on a shaft 2 which is supported in the casing 1 of the dynamo. This dynamo also includes first and second stator members 5 and 7 respectively. Inner stator member 5, composed of a bundle of laminations, is mounted on a centric projection 4 of the casing 1. Outer stator member 7 is also composed of laminations. It is seen to be in the form of a ring and embedded in casing 1 in such a manner that it may be rotated by means of an adjusting pointer 11 secured to the stator ring 7 which is accessible through a slot-type recess 10 formed in the casing 1. The drum rotor 3 is seen positioned between the inner and outer stator members 5 and 7 respectively. It is free to rotate in an air gap 9 provided between the stator members. To adjust for a zero condition the stator ring 7 is rotated relative to the stator bundle 5 by small movements of the adjusting pointer 11.

The dynamo constructed in accordance with the present invention further includes first and second windings both represented in FIGURE 1 by a cross winding 6. The cross winding 6 is wound on the inner stator member 5. Referring to FIGURE 2, the cross winding 6 is seen to consist of an exciting winding 6a and a control winding 6b arrangd in spatially crossed relationship. In particular, the exciting winding 6a and the control winding 6b are arranged in quadrature relationship.

An exciting current may be supplied to the exciting winding 6a by way of terminals 14a and 14b in FIGURE 2. When this current is supplied to the exciting winding 6a, a magnetic field is established between the stator bundle 5 and the stator ring 7 with the stator ring 7 serving as a magnetic loop. When the dynamo is operated as a generator, the voltage at a pair of terminals 15a and 15b, connected to the control winding 6b, should be zero if the rotor 3 is at a standstill. When the dynamo is operated as a motor, rotor 3 should be at a standstill if zero voltage is applied to the control winding 6b by way of terminals 15a and 15b. Because of inevitable fabricating tolerances these ideal conditions are not achieved. An undesirable residual voltage or an undesirable residual torque are developed under zero conditions.

Accordingly, a dynamo constructed in accordance with one aspect of the present invention further includes means for introducing magnetic irregularities preferably in the stator ring 7. These magnetic irregularities are introduced to compensate for the lack of homogeneity in the dynamo elements. In the embodiment of FIGURES 1 and 2 these magnetic irregularities are developed by a compensation winding 8 wound on the stator ring 7. Winding 8 is connected across a resistor $R_k$ connected into the circuit of the exciting winding 6a so that a portion of the exciting current is supplied to the compensation winding. By adjustably rotating the stator ring 7 the inductive coupling between the exciting winding 6a and the control winding 6b can be influenced and thereby the undesired residual effects are eliminated.

Although the exciting winding and the control winding may be mounted on the inner stator member 5 as well as the outer stator member 7, it is desirable to have the stator member serving as the magnetic loop fashioned as a stator ring supported in the dynamo casing thus being accessible through a slot-type recess in the casing.

FIGURE 3 shows a second embodiment of a dynamo constructed in accordance with the present invention. In this embodiment the magnetic irregularities introduced in the second or outer stator member are achieved by forming the stator ring 7' with a number of grooves 12' corresponding to the pole number. These grooves are effective to develop the desired irregularities so that on rotation of the stator ring 7', a displacement of the magnetic flux influencing the coupling takes place.

A further improvement in the development of the magnetic irregularities in FIGURE 3 embodiment is the insertion of non-ferromagnetic parts in the grooves in the stator ring 7'.

While there have been described what are at present considered preferred embodiments of this invention, it will be obvious to those skilled in the art that various changes and modifications may be made therein without departing from the invention, and it is therefore aimed to cover all changes and modifications as fall within the true spirit and scope of the invention.

I claim:
1. A dynamo comprising:
   first and second stator members movable relative to each other;
   first and second windings wound on said first stator member in spatially crossed relationship;
   a rotor member positioned between said stator members and free to rotate therebetween;
   means for supplying an exciting current to said first winding to establish a magnetic field between said stator members;
   a third winding wound on said second stator member substantially in spatially parallel relationship to said first winding;
   and means for coupling a portion of said exciting current to said third winding.

2. The dynamo of claim 1 wherein said first and second stator members are concentric and said first stator member is the inner member.

3. A rotary variable electromagnetic coupling device comprising:
   first and second stator members of magnetic material which define an air gap therebetween, one of said members being adjustably movable with respect to the other member during operation of the device,
   first winding means and second winding means wound on said first stator member approximately in quadrature relationship,
   a rotor member of electrically conductive non-magnetic material supported for rotation in said gap between said stator members,
   connection means for energizing said first winding means from an external source of excitation voltage to etablish a magnetic field across said gap between said stator members,
   means including third winding means wound on said second stator member for compensating for undesirable residual effects when said rotor is substantially at rest,
   and connection means for energizing said third winding means from said excitation source so that said residual effects are decreased after said one stator member has been adjustably moved with respect to the other stator member.

4. A rotary variable electromagnetic coupling device comprising
   a generally cylindrical inner stator member of magnetic material,
   a ring-like outer stator member of magnetic material which is supported concentrically with respect to said inner member to define an air gap therebetween and which is adjustably rotatable with respect to said inner member during operation of the device,
   first winding means and second winding means wound on said inner stator member approximately in quadrature relationship,
   a rotor member of electrically conductive non-magnetic material supported for rotation in said gap between said stator members,
   connection means for energizing said first winding means from an external source of excitation voltage to establish a magnetic field across said gap between said stator members,
   means including third winding means wound on said outer stator member for compensating for undesirable residual effects when said rotor is substantially at rest,
   and connection means for energizing said third winding means from said excitation source so that said residual effects are decreased after said outer stator member had been adjustably rotated with respect to said inner stator member.

References Cited by the Examiner

UNITED STATES PATENTS

| 2,738,434 | 3/1956 | Couzens et al. | 310—171 |
| 2,889,475 | 6/1959 | Emerson | 310—171 |

ORIS L. RADER, *Primary Examiner.*

MILTON O. HIRSHFIELD, *Examiner.*

D. F. DUGGAN, *Assistant Examiner.*